United States Patent [19]

Goldberg

[11] Patent Number: 5,434,398

[45] Date of Patent: Jul. 18, 1995

[54] MAGNETIC SMARTCARD

[75] Inventor: Samuel Goldberg, Even Yehuda, Israel

[73] Assignee: Haim Labenski, Tel Aviv, Israel

[21] Appl. No.: 199,881

[22] Filed: Feb. 22, 1994

[51] Int. Cl.$^6$ ............................................. G06K 5/00
[52] U.S. Cl. ................................. 235/380; 235/449; 235/492; 235/493
[58] Field of Search ................. 235/492, 443, 449, 380

[56] References Cited

U.S. PATENT DOCUMENTS

| | | | |
|---|---|---|---|
| 4,701,601 | 10/1987 | Francini et al. | 235/493 |
| 4,786,791 | 11/1988 | Hodama. | |
| 4,791,283 | 12/1988 | Burkhardt | 235/493 |
| 4,861,971 | 8/1989 | Chan | 235/384 |
| 4,876,441 | 10/1989 | Hara | 235/492 |
| 4,882,473 | 11/1989 | Bergeron | 235/492 |
| 4,899,036 | 2/1990 | McCrindle et al. | 235/492 |
| 4,910,582 | 3/1990 | Miyamoto | 235/492 |

*Primary Examiner*—Harold Pitts
*Attorney, Agent, or Firm*—Cushman Darby & Cushman

[57] ABSTRACT

A magnetic smartcard including a card base, an electric power source embedded in the card base which powers the magnetic smartcard, an at least partly ferromagnetic element embedded in the card base and arranged such that a portion of the ferromagnetic element is positioned at a location suitable for interfacing a magnetic card reader, a processor embedded in the card base which generates a modulated output corresponding to preselected card information and operative for updating the output in accordance with a preselected time schedule and an inductor operative to induce in the ferromagnetic element a modulated magnetic field corresponding to the modulated output.

20 Claims, 2 Drawing Sheets

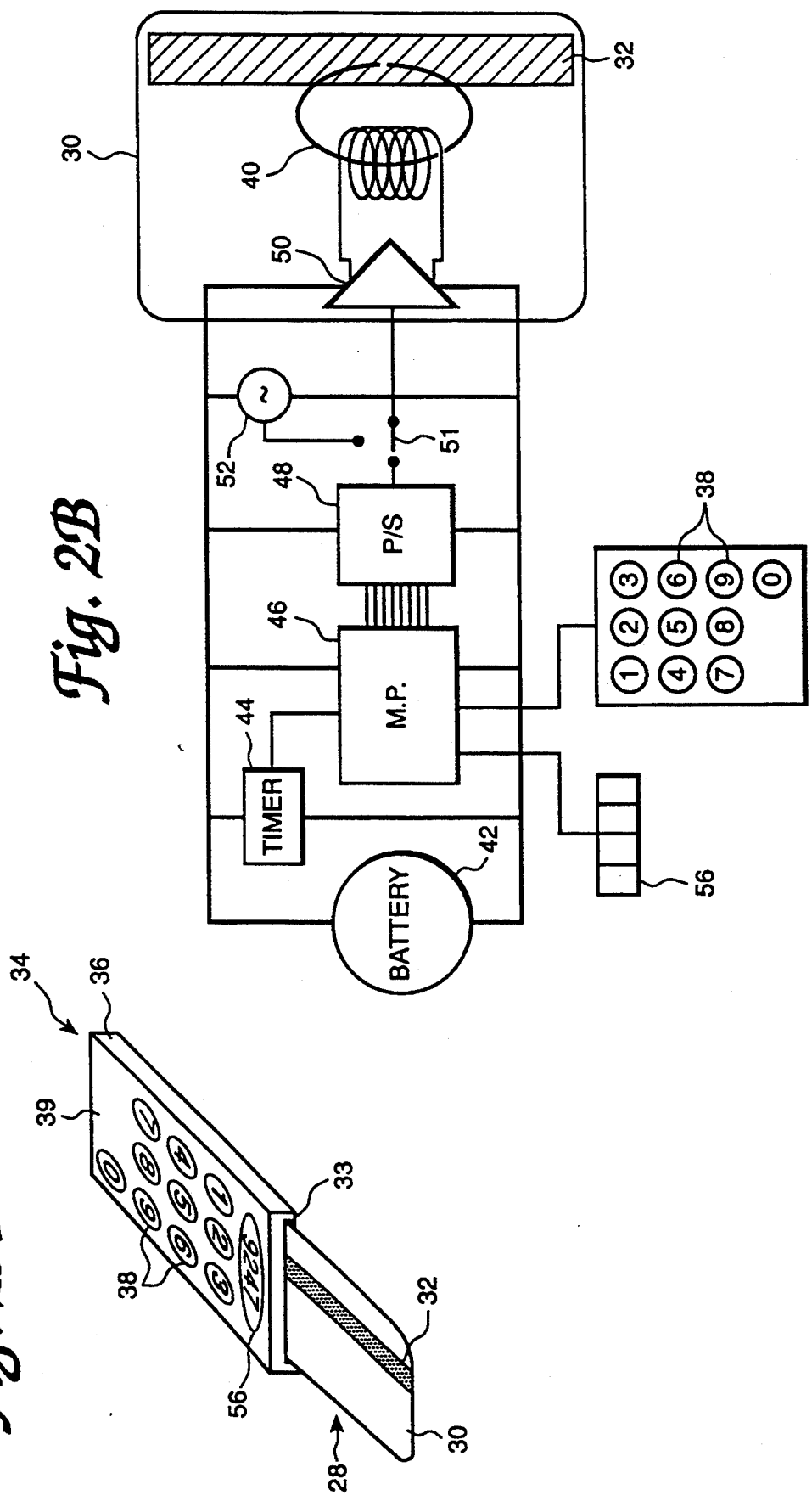

MAGNETIC SMARTCARD

FIELD OF THE INVENTION

The present invention relates to protection of magnetic cards in general and, more particularly, to methods and devices for preventing misuse and/or forgery of credit cards and the like.

BACKGROUND OF THE INVENTION

Magnetic cards are widely used for various applications. Monetary applications of magnetic cards include, for example, user cards for automated bank services and credit cards.

A magnetic card generally consists of a rigid card, preferably a plastic card, having a strip of magnetic tape attached to either or both sides thereof. Information, such as the name and address of a legitimate card holder, is typically printed or engraved on the card. Other information, for example a number identifying the card holder's bank or credit account, is magnetically recorded on the magnetic strip, preferably in digital form.

When the magnetic card is guided through a magnetic card reader, the magnetic strip on the card interfaces a reader head which reads the information recorded on the strip. Guided movement of the card relative to the reader head is generally provided either manually, by a user guiding the card through the card reader, or automatically. The card reader provides an output, preferably a digital electric output, corresponding to the information recorded on the magnetic strip of the card.

A computer, typically a bank or credit card company computer, communicating with a plurality of magnetic card readers as described above, compares the information read from the magnetic card with prestored data and determines whether the card is genuine, valid, etc., and if so, what options are available to the card holder. For example, the computer can determine the cash withdrawal limit or the available credit of the magnetic card holder at the time of attempted cash withdrawal or credit card purchase, respectively.

Although magnetic cards as described above are convenient and useful, these cards are susceptible to misuse and forgery. By reading the information recorded on the magnetic strip using simple magnetic readers, duplicate cards can be readily forged based on any given magnetic card known in the art. Furthermore, since considerable financial activity is performed through communication lines, magnetic card information can be picked off telephone lines without raising suspicion on the part of the card holder and the bank or credit card company. Unlike magnetic card thefts, which are generally reported shortly after occurrence and thus result in minor financial losses, forgery of magnetic cards is generally detected only after large amounts of money have been unlawfully acquired or spent.

Smartcards are well known in the art. Typically, a smartcard includes a microprocessor and means for electronic interface of the microprocessor with a preselected system, generally a protected system, for example a classified computer data base. Authenticity, validity, etc., of smartcards is generally determined by interactive communication between the protected system and the microprocessor of the smartcard. Smartcards often include a user interface, such as a miniature keyboard, whereby the user communicates with the protected unit, mainly for user identification purposes.

It is appreciated that, unlike magnetic cards, smartcards are not readily duplicated or forged using conventional devices. In fact, reverse engineering followed by Hi Tech production processes may be required in order to reconstruct an existing smartcard.

SUMMARY OF THE INVENTION

The present invention seeks to provide a convenient solution to the above mentioned problems associated with magnetic cards using conventional magnetic card readers. According to one aspect of the present invention, the information communicated to the magnetic card reader is not fixed but, rather, the information is updated in accordance with a preselected time schedule.

According to another aspect of the present invention, the information communicated to the magnetic card reader does not reside on the magnetic card at all times but, rather, the information is written onto the magnetic card before actual communication with the magnetic card reader. Additionally, in a preferred embodiment of this aspect of the present invention, the information is updated in accordance with a preselected time schedule.

In accordance with one preferred embodiment of the present invention, there is thus provided a magnetic smartcard including:
a card base;
an electric power source, embedded in the card base, which powers the magnetic smartcard;
an at least partly ferromagnetic element, embedded in the card base and arranged such that a portion of the element is positioned at a location suitable for interfacing a magnetic card reader;
a processor, embedded in the card base, which generates a modulated output corresponding to preselected card information and operative for updating the output in accordance with a preselected time schedule; and
an inductor operative to induce in the ferromagnetic element a modulated magnetic field corresponding to the modulated output.

In a preferred embodiment of the invention, the magnetic smartcard further includes a timer, embedded in the card base, which provides the time schedule to the processor. Preferably, the magnetic card reader is associated with a card information data-base which is updated in accordance with the preselected time schedule.

In a preferred embodiment of the present invention, the portion of the ferromagnetic element suitable for interfacing a magnetic reader includes both a ferromagnetic material and a diamagnetic material.

In accordance with another preferred embodiment of the present invention, there is provided a portable, smart, magnetic interface device for use with at least one magnetic card having a magnetic strip, including:
a housing;
an electric power source, in the housing, which powers the interface device;
at least one slot, associated with the housing, suitable for accommodating the magnetic card;
a processor which generates an output corresponding to preselected card information; and
a magnetic head associated with the slot and arranged to operatively engage the magnetic strip when the magnetic card is at least partly inserted into the slot, wherein the magnetic head is operative in a writing mode of operation to receive the output and, based on the output, to magnetically write the card information onto the magnetic strip of the magnetic card, and wherein the magnetic head is operative in an erase mode of operation to erase intelligible information from the magnetic strip.

Preferably, the processor is further operative for updating the output in accordance with a preselected time schedule.

Alternatively, in accordance with a preferred embodiment of the invention, there is provided a portable, smart, magnetic interface device for use with at least one magnetic card having a magnetic strip, including:

a housing;

an electric power source in the housing which powers the interface device.

at least one slot, associated with the housing, suitable for accommodating the at least one magnetic card;

a processor which generates an output corresponding to preselected card information and operative for updating the card information in accordance with a preselected time schedule; and a magnetic head associated with the slot and arranged to operatively engage the magnetic strip when the magnetic card is at least partly inserted into the slot, wherein the magnetic head is operative in a writing mode of operation to receive the output and, based on the output, to magnetically write the card information onto the magnetic strip.

In a preferred embodiment of the invention, the magnetic interface device further includes a timer which provides the time schedule to the processor. Preferably, the magnetic card is adapted to interface a magnetic card reader associated with a card information database which is updated in accordance with the preselected time schedule.

In accordance with a preferred embodiment of the present invention, the magnetic interface device further includes a user-interface associated with the processor. Preferably, the processor enables writing of the card information on the magnetic strip only upon entry of a preselected user code through the user interface.

Preferably, in all the above described embodiments of the present invention, the card information includes an account identification code.

BRIEF DESCRIPTION OF THE DRAWINGS

The present invention will be better understood from the following detailed description of preferred embodiments of the invention, taken in conjunction with the following drawings in which:

FIG. 2A is a pictorial illustration of a magnetic card partly inserted into a smart magnetic interface device constructed and operative in accordance with a preferred embodiment of another aspect of the present invention; and FIG. 2B is a schematic illustration of circuitry useful for the operation of the smart magnetic interface device of FIG. 2A.

DETAILED DESCRIPTION OF A PREFERRED EMBODIMENT

Figure 1:
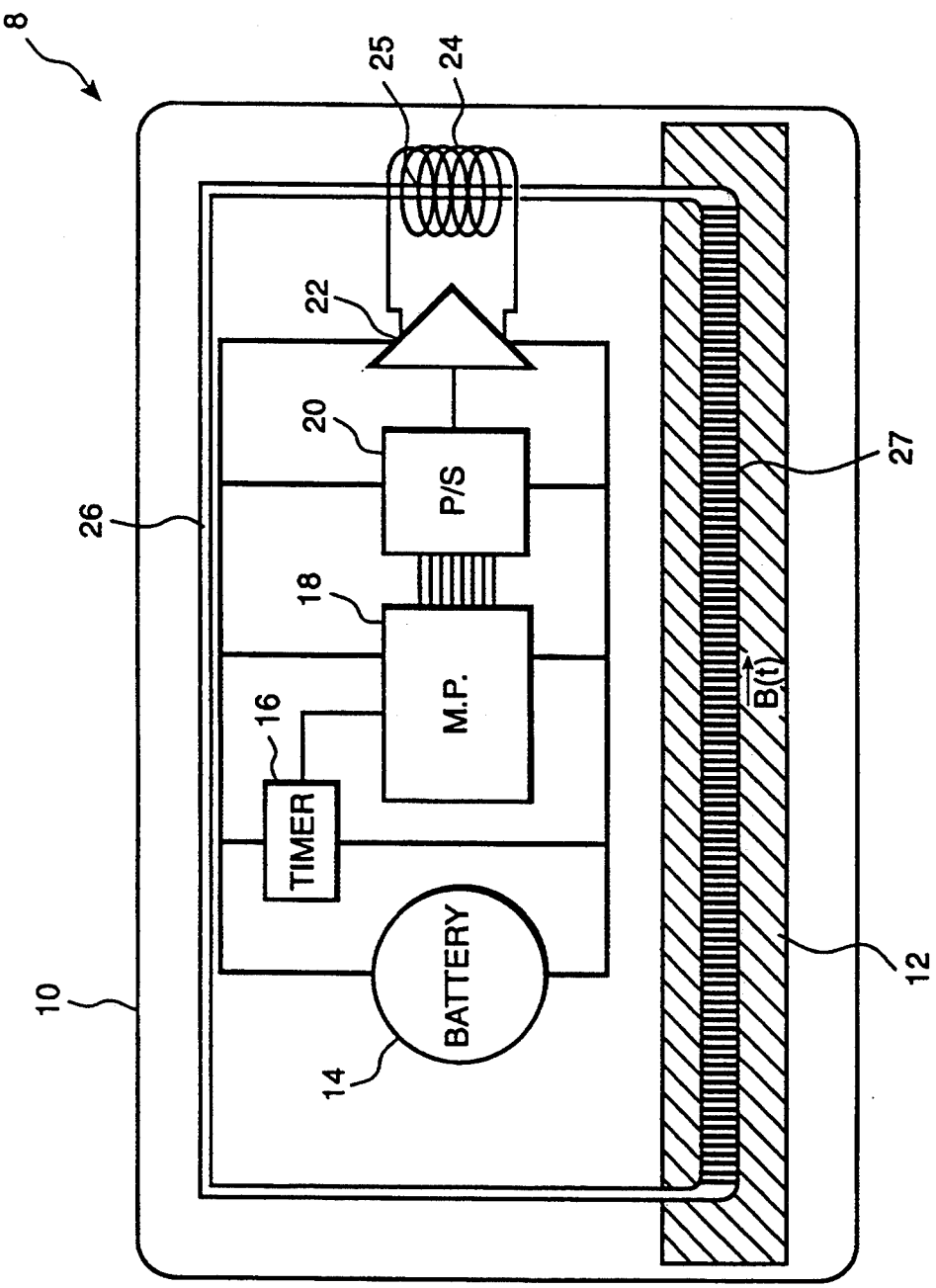
FIG. 1 is a schematic illustration of a magnetic smartcard, constructed and operative in accordance with a preferred embodiment of one aspect of the present invention.

Reference is now made to FIG. 1, which schematically illustrates a smartcard 8, constructed and operative in accordance with one preferred embodiment of the present invention and including a card base 10, preferably formed of a firm, thin, plastic material having approximately the dimensions of a conventional credit card. Embedded in card base 10, card 8 includes a microprocessor 18, associated with a timer 16 and connected, via a parallel to serial (P/S) converter 20, to an amplifier 22 which operates a magnetic inductor element 24, preferably including a flat coil. The circuit described above is powered by an electric power source 14, preferably a flat battery embedded in card base 10.

Embedded in card base 10, card 8 further includes an induction loop 26 formed, at least partly, of a ferromagnetic material. In a preferred embodiment of the invention, a first portion 25 of loop 26 is inductively associated with element 24, e.g. a coil of inductor 24 is wrapped around portion 25 of loop 26. A second portion 27 of loop 26 is preferably located substantially under an area 12 of card 8 which corresponds to the location of a magnetic recording strip on a conventional magnetic card.

While loop 26 is preferably formed mostly of a ferromagnetic material, portion 27 of loop 26 is preferably formed of a predetermined combination of ferromagnetic and diamagnetic materials which yields the following: (a) electromagnetic fields induced by inductor 24 in loop 26 are regenerated to the vicinity of portion 27, to be picked off by the reader head of a magnetic reader; (b) the magnitude of the regenerated magnetic fields is substantially uniform along portion 27 and suitable for reading by the magnetic reader; and (c) the electric energy consumed by inductor 24 is minimized.

During operation, microprocessor 18 controls amplifier 22, via P/S converter 20, such that inductor element 24 induces in ferromagnetic loop 26 a preselected, time-dependent, modulated magnetic field, $\bar{B}(t)$, corresponding to digitally coded information, such as a code identifying card 8. In a preferred embodiment of the present invention, the coded information represented by modulated magnetic field $\bar{B}(t)$ is changed, occasionally or periodically, in accordance with a preselected scheme. For example, if the coded information includes a twelve-digit code of card 8, the last four digits may be changed periodically, such as every 60 minutes. Timer 16 provides microprocessor 18 with a time base for precise, timely, updating of the coded information.

In a preferred embodiment of the invention, card 8 is adapted to interface conventional magnetic card readers (not shown), such as the automatic credit card readers associated with a store's cash register or the magnetic card readers of automatic bank services, which are generally in real-time communication with a central computer of a bank or credit card company. Since portion 27 of loop 26 is located substantially at the location of the magnetic strip on a conventional magnetic card, magnetic interface between portion 26 and the magnetic card readers may be achieved in a conventional manner, i.e. by inserting card 8 into a reading slot of an automatic bank teller, or by manually guiding card 8 through a reading channel of a credit card reader.

It should be appreciated that the time variation of modulated magnetic field $\bar{B}(t)$, in the vicinity of portion 27 of loop 26, generally cannot be distinguished by the card reader from a corresponding spatial magnetic field variation, such as the spatial variation of the magnetic field along the magnetic strip of a conventional magnetic card. Since the field generated by portion 27 of loop 26 is spatially homogeneous, reading of magnetic smartcard 8 by a conventional card reader is substantially unaffected by movement of card 8 with respect to the magnetic reader, as long as magnetic smartcard 8 is operatively engaged with the card reader.

At the central computer, the coded information read off magnetic smartcard 8 is compared with data from a reference data base associated with the central computer, thereby to determine whether the card is genuine, valid and so on. Since the coded information changes periodically, the central computer preferably includes a timer circuit and appropriate software which updates the reference data base in accordance with the changing codes of individual magnetic smartcards 8. It should be appreciated that card 8 cannot be duplicated or forged by copying coded information generated from loop 26 since, in a preferred embodiment of the invention, the information picked up at the time of copying remains relevant only for a short period of time. For example, if a magnetic card is forged based on the code 12345678-0123, picked off magnetic smartcard 8, the forged card would be useless after a short time period, when the code has been changed to 12345678-9876. Since the data base of the central computer is correlated with the secret code alteration scheme of individual cards 8, the forged card can be detected by detecting a discrepancy between the number read from the card, e.g. 12345678-1234, and the number retrieved from the updated data base of the central computer, e.g. 12345678-9876.

Reference is now made to FIG. 2A, which illustrates a magnetic card 28 partly inserted into a card slot 33 of a smart magnetic interface device 34 constructed and operative in accordance with another preferred embodiment of the present invention, and to FIG. 2B which schematically illustrates circuitry useful for the operation of the smart magnetic interface device of FIG. 2A.

According to this preferred embodiment of the present invention, magnetic card 28 can be any conventional magnetic card known in the art, including a firm, preferably plastic, card base 30 having a magnetic recording strip 32 attached to a surface thereof. Smart magnetic interface device 34 preferably includes a housing 36 and user input keys 38, preferably located on the top surface 39 of housing 36, which will be hereinafter referred to also as keyboard 38. Alternatively, as described below, input keys 38 may be excluded from interface device 34. Interface device 34 is preferably further provided with command buttons (not shown), preferably also located on surface 39 of housing 36, which control the operation of device 34 as described below. Interface device 34 preferably further includes a display 56, preferably also located on surface 39, for displaying inputs entered through keyboard 38.

In a preferred embodiment of the present invention, as shown in FIG. 2B, interface device 34 further includes a microprocessor 46, associated with a timer 44 and connectable, via a parallel to serial (P/S) converter 48 and a write/erase switch 51, to an amplifier 50 which operates a compact magnetic head 40, as more fully described below. Interface device 34 is preferably powered by a compact voltage source 42, such as a lithium battery. As further shown in FIG. 2B, keyboard 38 and display 56 are also connected to microprocessor 46.

When card 28 is at least partly inserted into card slot 33, magnetic head 40 operatively engages magnetic strip 32, such that preselected information, preferably digitally coded information, may be magnetically written onto magnetic strip 32 or erased therefrom. In a preferred embodiment of the present invention, writing and/or erasure of information are performed during movement of card 28 into or out of slot 33. Preferably, writing onto strip 32 is performed during withdrawal of card 28 from slot 33 and erasure is performed during insertion of card 28 into slot 33. Thus, write/erase switch 51 may be automatically switched to a writing mode, in which P/S converter is connected to amplifier 50, when card 28 is withdrawn from slot 33, and automatically switched to an erase mode, in which an erasure signal generator 52 is connected to amplifier 50, when card 28 is inserted into slot 33. Additionally or alternatively, an "erase" command button and a "write" command button (not shown) may be used to activate the erase mode and writing mode, respectively, of device 34. In a preferred embodiment of the invention, information is written onto strip 32 only shortly before card 28 is to be used and erased immediately thereafter.

The information written by magnetic head 40 onto magnetic strip 32 preferably includes a preset code, provided by microprocessor 46 through P/S converter 48 and amplifier 50, which identifies magnetic card 28. The code may be a fixed code, such as the bank or credit account number stored on conventional magnetic cards, or it may be modified periodically, as described above with reference to magnetic smartcard 8 in the embodiment of FIG. 1. If the code is to be changed periodically, timer 44 provides microprocessor 46 with a time base for timely updating of the coded information, in correlation with a central bank or credit company computer, as described above with reference to FIG. 1.

In the erase mode, generator 52 generates an erasure signal to amplifier 50. Consequently, amplifier 50 operates magnetic head 40 as an erase head erasing any intelligible magnetic information from strip 32 of card 28. It should be appreciated that even if the preset code written on strip 32 is not modified periodically, i.e. fixed, a stolen card 28 would be useless as long as strip 32 remains erased, preferably at any time other than during actual use by the legitimate card holder.

In a further preferred embodiment of the present invention, a preselected user code must be entered into microprocessor 46 by a user of interface device 34, using keyboard 38, before microprocessor 46 proceeds to write onto magnetic card 28. This prevents misuse of magnetic card 28 even when interface device 34 is stolen.

Although interface device 34 has been thus far described in conjunction with a single magnetic card 28, it should be appreciated that, using appropriate software, microprocessor 46 can be adapted to operatively interface a plurality of magnetic cards 28, including various credit cards, automatic banking cards, transportation passes, security clearance passes, and so on. The different magnetic cards 28 can be handled sequentially, whereby a different code is generated by microprocessor 46 for each magnetic card 28, in accordance with user instructions entered through keyboard 38 and/or the command buttons.

Alternatively, in a preferred embodiment of the present invention, interface device 34 may be modified so as to include a plurality of slots, such as slot 33, one for each magnetic card 28. According to this embodiment of the invention, magnetic head 40 may be configured to operatively engage more than one magnetic card 28 or, alternatively, device 34 may include a plurality of magnetic heads, such as head 40, one for each of the plurality of slots.

It will be appreciated by persons skilled in the art that the present invention is not limited to what has been thus far described. Rather, the scope of the present invention is limited only by the following claims:

I claim:

1. A magnetic smartcard comprising:
    a card base;
    an electric power source, embedded in said card buss, which powers the magnetic smartcard;
    an at least partly ferromagnetic element, embedded in said card base, having an elongated portion which is shaped and positioned for operatively interfacing a magnetic card reader;
    a processor, embedded in said card base, which generates a modulated output corresponding to preselected card information and operative for updating said output in accordance with a preselected time schedule; and
    an inductor, associated with said processor, operative to induce in said ferromagnetic element a modulated magnetic field corresponding to said modulated output,
    wherein the at least party ferromagnetic element regenerates a substantially spatially uniform magnetic field, corresponding to said modulated magnetic fields, in the vicinity of said elongated portion.

2. A magnetic smartcard according to claim 1 and further comprising a timer, embedded in the card base, which provides said time schedule to said processor.

3. A magnetic smartcard according to claim 1 wherein said magnetic card reader is associated with a card information database which is updated in accordance with said preselected time schedule.

4. A magnetic smartcard according to claim 2 wherein said magnetic card reader is associated with a card information database which is updated in accordance with said preselected time schedule.

5. A magnetic smartcard according to claim 1 wherein said elongated portion of the ferromagnetic element comprises a predetermined combination of a ferromagnetic material and a diamagnetic material.

6. A magnetic smartcard according to claim 2 wherein said elongated portion of the ferromagnetic element comprises a predetermined combination of a ferromagnetic material and a diamagnetic material.

7. A magnetic smartcard according to claim 1 wherein said card information includes an account identification code.

8. A magnetic smartcard according to claim 2 wherein said card information includes an account identification code.

9. A magnetic smartcard according to claim 3 wherein said portion of the ferromagnetic element comprises a predetermined combination of a ferromagnetic material and a diamagnetic material.

10. A magnetic smartcard according to claim 4 wherein said portion of the ferromagnetic element comprises a predetermined combination of a ferromagnetic material and a diamagnetic material.

11. A magnetic smartcard according to claim 3 wherein said card information includes an account identification code.

12. A magnetic smartcard according to claim 4 wherein said card information includes an account identification code.

13. A magnetic smartcard according to claim 5 wherein said card information includes an account identification code.

14. A magnetic smartcard according to claim 6 wherein said card information includes an account identification code.

15. A magnetic smartcard according to claim 1 adapted for operatively interfacing said magnetic card reader during relative motion between said elongated portion and said magnetic card reader.

16. A magnetic smartcard according to claim 2 adapted for operatively interfacing said magnetic card reader during relative motion between said elongated par%ion and said magnetic card reader.

17. A magnetic smartcard according to claim 3 adapted for operatively interfacing said magnetic card reader during relative motion between said elongated portion and said magnetic card reader.

18. A magnetic smartcard according to claim 5 adapted for operatively interfacing amid magnetic card reader during relative motion between said elongated portion and said magnetic card reader.

19. A magnetic smartcard according to claim 6 adapted for operatively interfacing said magnetic card reader during relative motion between said elongated portion and said magnetic card reader.

20. A magnetic smartcard according to claim 7 adapted for operatively interfacing said magnetic card reader during relative motion between said elongated portion and said magnetic card reader.

* * * * *